United States Patent [19]

Fecto et al.

[11] Patent Number: 5,252,165

[45] Date of Patent: Oct. 12, 1993

[54] METHOD OF MAKING CONTOURED FIBER REINFORCED BODY

[75] Inventors: Marcia A. Fecto, North Canton; John A. Violette, Granby, both of Conn.

[73] Assignee: United Technologies Corporation, Hartford, Conn.

[21] Appl. No.: 826,343

[22] Filed: Jan. 27, 1992

Related U.S. Application Data

[62] Division of Ser. No. 585,838, Sep. 20, 1990, abandoned.

[51] Int. Cl.⁵ .......................................... B32B 31/04
[52] U.S. Cl. .................................. 156/228; 156/242; 156/245; 428/222
[58] Field of Search ................. 156/228, 242, 245, 93; 428/222

[56] References Cited

U.S. PATENT DOCUMENTS

| | | | |
|---|---|---|---|
| 3,185,605 | 5/1965 | Osborne et al. | 156/245 |
| 3,873,654 | 3/1975 | Smith | 156/245 |
| 3,970,495 | 7/1976 | Ashton et al. | 156/162 |
| 4,470,862 | 9/1984 | More et al. | 156/245 |
| 4,471,020 | 9/1984 | McCarthy | 156/245 |
| 4,639,284 | 1/1987 | Mouille et al. | 156/245 |
| 4,648,921 | 3/1987 | Nutter, Jr. | 156/77 |
| 4,894,108 | 1/1990 | Richard et al. | 156/245 |
| 4,990,207 | 2/1991 | Sakai et al. | 156/245 |

Primary Examiner—Caleb Weston
Attorney, Agent, or Firm—William W. Habelt

[57] ABSTRACT

A method of manufacturing a fiber reinforced article using a fiber preform 10 suitable for impregnating with a curable resin to form the fiber reinforced article. The fiber preform 10 is formed by fitting a plurality of preformed seamless fabric envelopes 20 over an inner mold body 30 one over another in a layered fashion. An outer mold body 40 is placed over the completed fiber preform 10 prior to injecting a curable resin into the mold cavity 50 housing the fiber preform 10. The preform 10 comprises an innermost seamless fabric envelope 20A preformed to closely match a desired contour of the inner surface of the manufactured article, an outermost seamless fabric envelope 20B preformed to closely match a desired contour of the outer surface of the manufactured article, and an intermediate layer of at least one intermediate seamless fabric envelope 20C disposed therebetween.

3 Claims, 1 Drawing Sheet fig.1
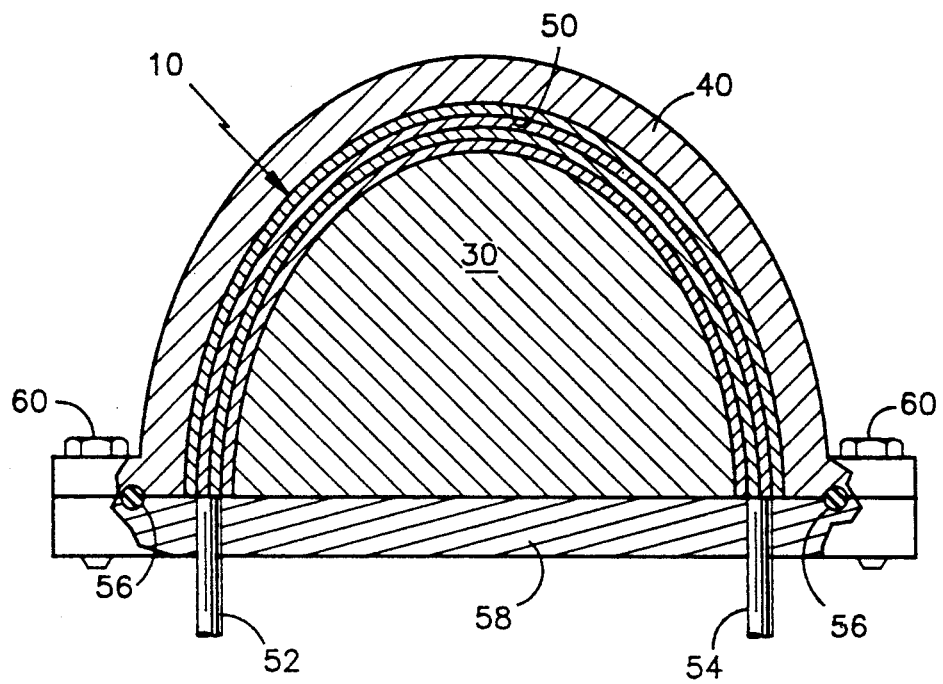
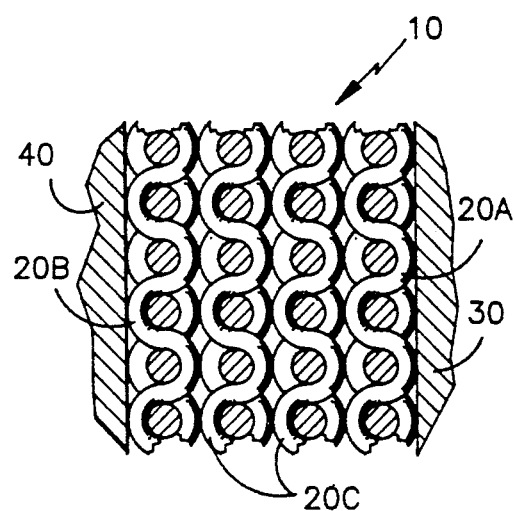
fig.2

METHOD OF MAKING CONTOURED FIBER REINFORCED BODY

This is a division of application Ser. No. 07/585,838 filed on Sep. 20, 1990, abandoned.

1. Technical Field

The present invention relates to the manufacture of contoured fiber reinforced bodies and, more specifically, to the manufacture of aerodynamically contoured fiber reinforced bodies produced by resin transfer molding methods.

2. Background Art

It has become conventional practice in the aircraft industry to manufacture various aerodynamically contoured parts, for example spinners and afterbodies for turbofan engines, in the form of molded fiber reinforced resin bodies. Such fiber reinforced resin bodies exhibit high strength and low weight characteristics and in aircraft applications typically offer at least as high strength as corresponding articles made of metal at a substantially lower weight. For example, commonly assigned U.S. Pat. No. 4,648,921 discloses a method of making a fiber reinforced airfoil shaped propeller blade assembly wherein 4 to 7 layers of woven fiberglass cloth are laid up over a foam underbody formed about a metallic spar to provide the matrix into which the resin material is injected. Each of the fiberglass layers is trimmed to its desired contour and then hand stitched in place over the foam underbody. The subassembly thus covered is then placed in a mold and a synthetic polymeric material applied thereto, such as by resin injection.

In conventional practice, aerodynamically contoured fiber reinforced bodies, such as spinners and afterbodies, are also made by forming a fabric preform between an inner mold body and an outer mold body prior to resin injection. The outer surface of the inner mold body and the inner surface of the outer mold body are shaped to provide the desired contour for the inner and outer surfaces, respectfully, of the resultant resin body.

To make the fabric preform which provides the fiber reinforcement to the resultant resin body, layers of fabric are built up over the inner mold body. To do so, a sheet of fabric is rough cut from a bolt of woven fiberglass, fit over the inner mold body, trimmed to the contour of the inner mold body and thence stitched by hand to form a fabric envelope about the inner mold body. Repeated layers of fabric envelopes are made in this manner and laid up over each to provide a preform of the desired thickness. In laying up the fabric layers, care must be taken to ensure that the overlap seams or butted seams produced when stitching the fabric envelopes are not disposed one atop another thereby destroying the uniformity of the fiber reinforcement layers. As the fabric envelopes are hand stitched, it is impossible to produce consistent end products. Consistency is important for the dynamic balancing and strength of high speed rotating parts. Additionally, end products must occasionally be rejected due to the presence of foreign objects, including pins and needles misplaced during the stitching process and subsequently buried in the laminate of fabric layers. The presence of the seams and stitches in the envelopes also degrades the laminate in the areas in which they are located.

A method of forming a fabric preform without hand stitching is disclosed in commonly assigned U.S. Pat. No. 4,470,862. As discussed therein, the hand stitching is eliminated by adhesively bonding each fiberglass layer to the layer therebeneath. To do so, the fiberglass material is provided on its underside with a minute, but effective, amount of thermoplastic adhesive. The material is then trimmed to shape and placed in position over the subassembly. Thereafter the adhesive is activated by heat and pressure by means of an electric resistance heated hand iron applied to the surface of the fiberglass material. Although the use of such adhesive coated fiberglass material does indeed eliminate the need for hand stitching, this method of laying up the fiberglass layers is still quite labor intensive and a seam must still be formed.

It is an object of the present invention to provide a method of manufacturing fiber reinforced contoured bodies wherein the step of stitching of the fabric or otherwise hand forming a seam in laying up the fabric envelopes comprising the fiber preform is eliminated.

It is a further object of the present invention to provide a fiber preform formed of layers of seamless fabric envelopes.

It is a still further object of the present invention to provide a fiber reinforced resin body comprised of a plurality of layered seamless fabric envelopes embedded in a resin material.

DISCLOSURE OF INVENTION

In accordance with the present invention, there is provided a method of manufacturing a fiber reinforced article using a preform suitable for impregnating with a curable resin material to form a fiber reinforced article. The fiber preform is formed by fitting a plurality of preformed seamless fabric envelopes over an inner mold body one over another in a layered fashion. The inner mold body has an outer surface which is contoured to the desired shape of the inner surface of the manufactured article. After the fiber preform has been completed, an outer mold body is placed over the fiber preform prior to impregnating the fiber preform with a curable resin material whereby upon curing of the resin, the fiber preform is embedded in the resin material. The outer mold body has an inner surface which is contoured to the desired shape of the outer surface of the manufactured article.

Advantageously, the preform comprises an innermost seamless fabric envelope preformed to closely match a desired contour of the inner surface of the manufactured article, an outermost seamless fabric envelope preformed to closely match a desired contour of the outer surface of the manufactured article, and an intermediate layer of at least one intermediate seamless fabric envelope disposed between the innermost and the outermost fabric envelopes.

BRIEF DESCRIPTION OF DRAWING

These and other objects, features and advantages of the present invention will become more apparent in light of the detailed description of a preferred embodiment thereof with reference to the accompanying drawing wherein:

FIG. 1 is a cross-sectional side elevational view of a mold assembly disposed about the fiber preform of the present invention for use in carrying out the method of the present invention; and FIG. 2 is an enlarged cross-sectional view of the fiber preform of FIG. 1.

BEST MODE FOR CARRYING OUT THE INVENTION

The present invention will be described hereinafter in greater detail as applied to the manufacture of a spinner body for use in a turbine engine. However, it is to be understood that the present invention relates to the manufacture of contoured fiber reinforced articles in general and may be employed to manufacture fiber reinforced articles of any shape wherein a fiber material is layered up about an inner mold body to form a fiber preform which is subsequently impregnated with a resin material to form the contoured article.

As illustrated in the drawing, the fiber preform 10 is formed of a plurality of layers 20 of fabric material, such as conventional commercially available woven fiberglass cloth, fitted over an inner mold body 30 and disposed within an outer mold body 40 coupled in conventional manner to the inner mold body to form a mold assembly adapted for receiving a suitable resin material via a conventional molding practice. For example, a thermosetting material may be introduced into the mold cavity 50 formed between the inner mold body 30 and the outer mold body 40 and occupied by the fiber preform 10 via vacuum injection. To do so, a vacuum source (not shown) is connected to the vacuum port 52 and a vacuum created within the mold cavity 50. The desired thermosetting material is then introduced into the evacuated mold cavity 50 through injection port 54. The thermosetting material may comprise any conventional molding material suitable for the given application. A preferred molding material for use in manufacturing lightweight, high strength aircraft components via the method of the present invention is a liquid thermosetting epoxy resin such as Epon 828, available from Shell Chemical Co., Houston, Tex. After curing of the resin, the resultant fiber reinforced article is removed from the mold assembly and further worked as desired as in conventional practice.

One particularly suitable procedure for carrying out the injection molding process is outlined in the aforementioned U.S. Pat. No. 4,648,921. As disclosed therein, the mold assembly is provided with an annular compressible ring member 56 which is positioned outward of the inner mold body 30 between the outer mold body 40 and the mold assembly base 58. When the vacuum is being drawn and the resin injected, the mold assembly is only partially closed by means of bolts 60 so as to compress the annular member 56 thereby sealing the mold cavity 50 sufficiently to permit a vacuum to be drawn, but not fully closing the mold assembly. After resin injection has been completed, the mold assembly is fully closed by tightening down the bolts thereby forcing excess resin out of the mold cavity through the vacuum port 52 and the injection port 54. To polymerize and thereby cure the injected resin material, the mold assembly is heated to the required curing temperature of the resin material for the required curing time, typically about 45 to 60 minutes at about 250 F. The curing of the resin about the fibers in the layered substructure of the preform 10 results in a very strong structure.

However, it is to be understood that the impregnation of the fabric envelopes 20 of the preform 10 with resin may be accomplished by means other than injection molding. For example, the fabric envelopes 20 may be preimpregnated with the epoxy resin or the resin may be brushed on the fabric as the envelopes are laid-up and the impregnated preform than subsequently cured within the mold assembly to ensure that the manufactured article takes on the proper geometry. Such techniques however may not realize the manufacturing economies associated with the preferred procedure of injection molding.

The fiber preform 10 is advantageously formed by fitting a plurality of preformed seamless fabric envelopes 20 over the inner mold body 30, one over another in a layered fashion as best seen in FIG. 1. The inner mold body 30 is provided with an outer surface which is contoured to the desired shape of the inner surface of the manufactured article. After the fiber preform 10 has been completed, an outer mold body 40 is placed over the fiber preform 10 prior to impregnating the fiber preform with the curable resin material. The outer mold body is provided with an inner surface which is contoured to the desired shape of the outer surface of the manufactured article.

Advantageously, the fiber preform 10 comprises an innermost seamless fabric envelope 20A preformed to closely match the desired contour of the inner surface of the manufactured article and therefore to fit snugly over the outer surface of the inner mold body 30, an outermost seamless fabric envelope 20B preformed to closely match the desired contour of the outer surface of the manufactured article, and an intermediate layer of at least one intermediate seamless fabric envelope 20C disposed between the innermost fabric envelope 20A and the outermost fabric envelope 20B. As best seen in FIG. 2, each intermediate seamless fabric envelope 20C is preformed to have a contour such that when slipped over the previously laid-up envelopes, the installed fabric envelope will snugly fit over the contour of the preform subassembly provided by the next innermost fabric envelope. The fiber preform 10 will incorporate one or more intermediate fabric envelopes 20C with the exact number of intermediate envelopes 20C used in a given application depending upon the thickness of the fabric and the required wall thickness of the manufactured article.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method of manufacturing a fiber reinforced contoured article comprising the steps of:
   a. providing an inner mold body having an outer surface;
   b. fitting a plurality of preformed seamless fabric envelopes about said inner mold body one over another in a layered fashion thereby forming a fiber preform over said inner mold body;
   c. placing an outer mold body having an inner surface which is contoured to the desired shape of the outer surface of the manufactured article over the fiber preform formed about said inner mold body; and
   d. impregnating said fiber preform with a curable resin material whereby upon subsequent curing of the resin material the desired fiber reinforced contoured article is provided.

2. A method as recited in claim 1 wherein the step of fitting a plurality of preformed seamless fabric envelopes about said inner mold body one over another in a layered fashion comprises:

a. fitting an innermost seamless fabric envelope over said inner mold body to form an inner preform subassembly;

b. fitting a intermediate seamless fabric envelope over the inner preform subassembly to form an intermediate preform subassembly;

c. fitting an outermost seamless fabric envelope over the intermediate preform subassembly to form an outer preform assembly thereby forming said fiber preform; and d. prior to step c., repeating step b. as many times as necessary to provide a desired thickness.

3. A method as recited in claim 2 wherein:

a. the inntermost seamless fabric envelope is preformd to closely match the contour of the outer surface of said inner mold body;

b. the outermost seamless fabric envelope is preformed to closely match the contour of the inner surface of said outer mold body; and c. each intermediate seamless fabric envelope is preformed to closely match the contour of the outer surface of the preform subassembly formed by the next innermost fabric envelope.

* * * * *